Aug. 28, 1934.  E. E. CLARK  1,971,975
AUTOMOBILE BODY AND FENDER JACK
Filed Aug. 13, 1931  2 Sheets-Sheet 1

INVENTOR.
Edward E. Clark
BY
ATTORNEY.

Aug. 28, 1934.    E. E. CLARK    1,971,975
AUTOMOBILE BODY AND FENDER JACK
Filed Aug. 13, 1931    2 Sheets-Sheet 2
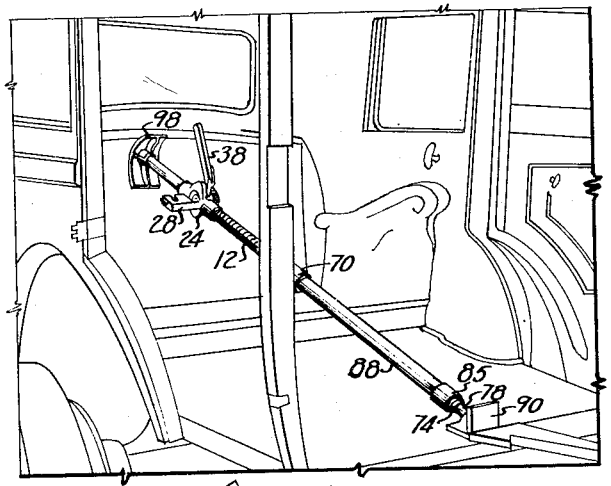
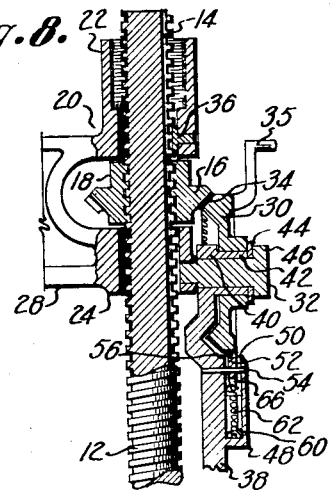
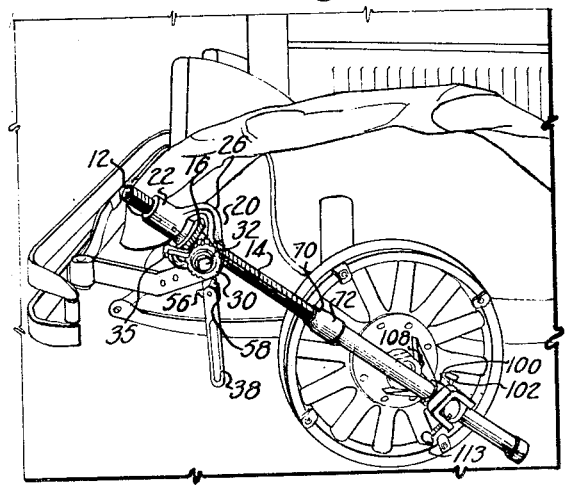
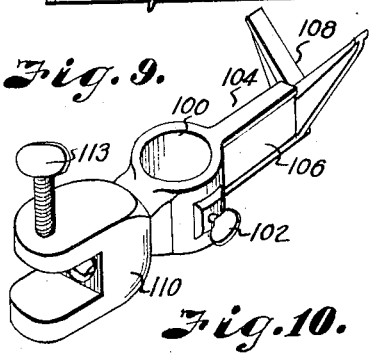
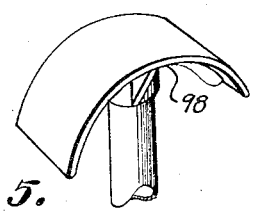
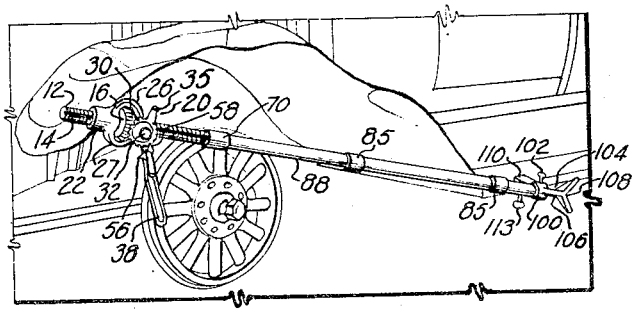
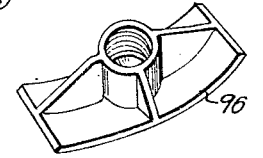
INVENTOR.
Edward E. Clark
BY
ATTORNEY.

UNITED STATES PATENT OFFICE 1,971,975

AUTOMOBILE BODY AND FENDER JACK

Edward E. Clark, Kansas City, Mo., assignor to Ben B. Weldon, Kansas City, Mo.

Application August 13, 1931, Serial No. 556,769

1 Claim. (Cl. 254—100)

This invention relates to jacks and like extensible devices including base and ram-like members which may be engaged with spaced elements for adjusting one or both of the elements upon extension or contraction of the device.

The principal objects of this invention are to adapt the principles of jacks to the reshaping of distorted portions of structure such as an automobile, and to provide a body and fender jack having replaceable bearing and anchoring heads corresponding to the normal shape of portions of an automobile with which the heads may be engaged, whereby a maximum variety of anchoring and reshaping effects may be obtained with no damage to normal structure.

In accomplishing these and other objects of the invention, I have provided improved details of structure, the preferred form of which is illustrated in the accompanying drawings, wherein:

Fig. 3 is a similar view illustrating the device having curved and right angle anchors at opposite ends.

Fig. 4 is an exterior perspective view of a portion of an automobile illustrating the device anchored to an axle for reshaping a fender.

Fig. 5 is a similar view illustrating the device anchored to a running board for reshaping a fender.

Fig. 8 is a longitudinal section through a portion of the screw, and the gear bracket and operating gears movable on the screw.

Fig. 9 is an enlarged perspective view of the anchor member shown in Figs. 4 and 5 that may be sleeved on and latched to the jack body, and having anchors engageable with differently shaped portions of an automobile.

Fig. 10 is a perspective view of an end portion of the jack body and a curved anchor member mounted thereon.

Fig. 11 is a perspective view of a curved anchor member having a threaded neck and a curved socket at the bottom of the neck.

Referring more in detail to the drawings:

12 designates a threaded shaft or screw having a longitudinal groove 14 as shown in Fig. 8, and 16 designates a bevel gear having an elongated hub-like body 18 threaded on the screw and operable to move a gear bracket 20 for actuating the device to move sleeves and anchor members as presently described, for exerting pulling or pushing effects on parts of an automobile.

Figure 6:
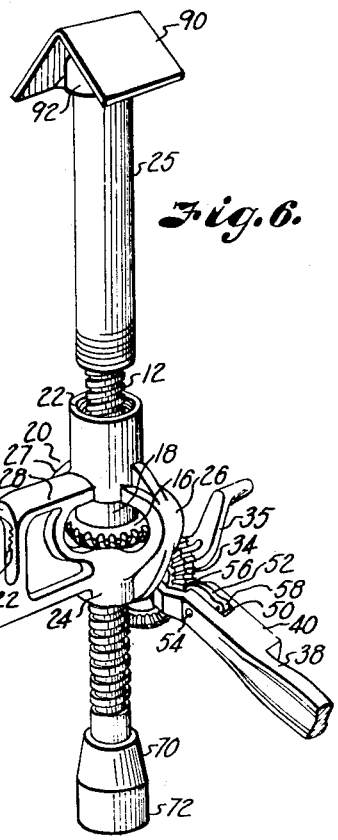
Fig. 6 is an enlarged perspective view of the device illustrating particularly a gear bracket on a jack screw and having a clamping member, and means for moving the bracket along the screw to shift an anchor-supporting sleeve.

The gear bracket includes collars 22 and 24 slidable over the threads of the screw and having inner ends engageable with the respective abutting ends of the body 18, and spaced sufficiently to permit the bevel gear to rotate freely between the collars, as best shown in Figs. 6 and 8. The upper collar 22 is elongated and provided with internal threads to engage one of the externally threaded ends of a ram-like sleeve or pipe 25 to form an elongated leg on the bracket.

The collars are connected by a pair of reinforced arms 26 and 27 diametrically opposite each other and shaped to accommodate the edge of the bevel gear that projects a substantial distance outwardly beyond the outer peripheries of the collars. A similar bracket arm 28 extends from the collars at right angles to the arms 26 and 27 to further connect the collars, and thus forms with the arms 26 and 27 a spider-like housing partly surrounding the screw and bevel gear.

The side of the bracket opposite the arm 28 is thus left open to accommodate gearing for actuating the bevel gear and bracket, including a driving ring gear 30 rotatable on a pin 32 projecting from the lower collar 24 diametrically oppositely to the arm 28 and having beveled teeth 34 meshed with the bevel gear. The gear 30 is manually operable by a crank handle 35 for rotating the bevel gear to shift the bracket along the screw.

The bracket is held against rotation on the screw by a key 36 having an elongated body slidable in the groove 14, said groove not only cutting the threads but extending slightly below the threads into the body of the screw to form a guide for the key.

The gear bracket when moved along the screw is adapted to effect pushing or pulling action on spaced portions of an automobile with which the device may be engaged as illustrated in Figs. 1 to 5. In order to apply sufficient force to exert the desired effect, a lever operated ratchet mechanism is provided to move the driving gear 30.

The ratchet device includes a lever 38 having a pivot portion 40 rotatably mounted on the pin 32 and preferably including a laterally extending sleeve 42 of reduced diameter on which the gear 30 is rotatively mounted. A washer 44 is retained by a flange 46 on the pin and retains the gear 30 on the sleeve.

The lever has a laterally projecting thickened boss-like portion 48 aligned with the sleeve, and provided with an elongated slot 50 aligned with the gear 30. A pawl 52 mounted on a pin 54 and operating in the slot 50 has a tooth 56 engageable with peripheral teeth on the gear 30 for rotating the gears in one direction upon pivotal movement of the lever. The pawl has an oppositely extending tooth 58 engageable with the peripheral teeth of the gear 30 when the pawl is swung in the opposite direction for rotating the gears oppositely as shown in Fig. 5.

In order to hold the pawl resiliently in driving relation with the ring gear, a cylindrical recess 60 is formed in the lever projection 48 at the bottom of the slot 50 as shown in Fig. 8, the extended axis of the recess intersecting the pawl pivot pin 54.

A cylindrical spring 62 operating in the recess and anchored to the end wall of the recess is thus guided to operate against the middle portion of the pawl and is connected to an ear 66 projecting from the upper side of the pawl. The spring will thus act angularly to urge one or another of the pawl teeth toward the gear wheel according to the direction in which the pawl is shifted to cause the ear to pass dead center.

Means suitable for a particular situation in which the device is to be used are provided for anchoring portions of the device to or engaging jack portions with spaced portions of an automobile or like spaced elements, for shaping or reshaping one of the portions. One feature of the anchoring means includes a base cap 70 fixed to one end of the screw and having an enlarged outer internally threaded end portion 72 forming a socket in which a base member 74 may be threaded to abut the end of the screw at the bottom of the socket.

Figure 7:
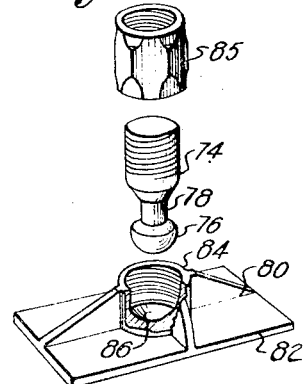
Fig. 7 is a perspective view of disassembled members of a ball and socket joint device for connecting an anchor to the jack body.

The base member 74 shown enlarged in Fig. 7 represents an element of one type of base anchoring means, and comprises a threaded body and a semi-spherical outer end 76 connected to the body by a reduced neck 78 to form the ball member of a ball and socket joint.

Figure 1:
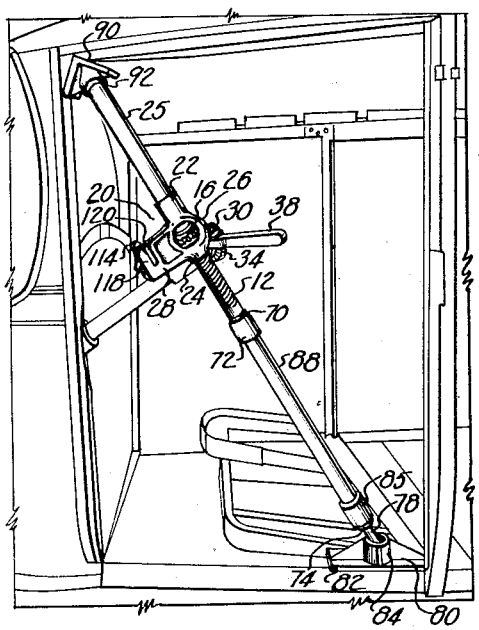
Fig. 1 is a fragmentary perspective view of the interior of an automobile body illustrating a reshaping tool embodying this invention in diagonal operating position in the body, and having triangular and flat anchoring heads or dollies engaged with spaced portions of the automobile.

Anchor members of various types may be provided to be connected to the base end of the jack body by a ball and socket joint, one type 80 illustrated in Figs. 1 and 7 consisting of a flat plate-like face member 82 adapted to seat against a normally flat surface such as the floor or vertical side wall of an automobile body. The anchor member has a tubular wall 84 forming a socket, and a curved recess 86 at the bottom of the socket as shown in Fig. 7, in which the ball 76 may seat. The reduced neck of the ball member 74 extends beyond the end of the socket wall 84 and thus permits the ball member to rock on the curved seat.

Figure 2:
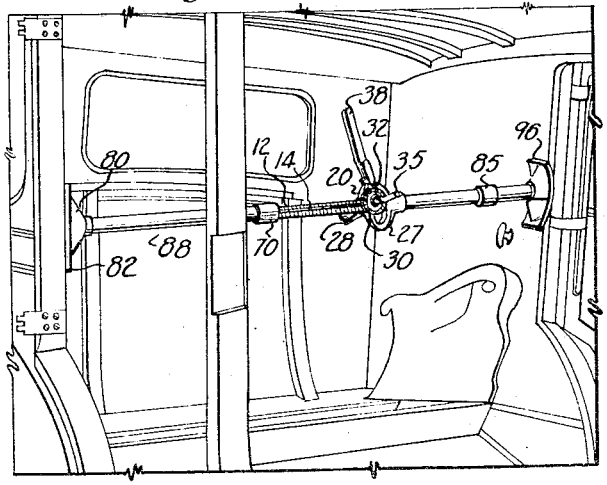
Fig. 2 is a similar view illustrating the tool arranged horizontally to bear against opposite vertical walls of the automobile body.

The wall 84 is internally threaded, and an extension member 88 consisting of a metal pipe has externally threaded opposite ends that may be threadedly mounted in the base cap 70 and socket 84 respectively, as shown in Fig. 2, to lengthen the jack body.

A number of extension pipes of various lengths may be provided to supplement the relatively limited extension capacity of the gear bracket and sleeve 25, and one pipe may be connected to another, and to the ball member 74, by suitable means such as a coupling 85 shown enlarged in Fig. 7. The extension pipe 88 may thus be threaded in the base cap 70 and connected with the ball member 74 as shown in Figs. 1 and 3.

The flat base member 80 may thus be seated on the floor of the automobile, and the jack body pivoted on the ball and socket joint, to locate the outer end of the sleeve 25 adjacent another portion of the automobile on which work is to be done, as shown in Fig. 1.

A head-like anchor member or dolly may be mounted on the outer end of the sleeve 25 to engage a portion of the automobile. In Figs. 1 and 6 a V-shaped head 90 is shown, having right angularly diverging faces and a socket portion 92 threaded on the sleeve to engage in a corner formed by diverging walls.

The apex of the head 90 may thus engage in the corner at the meeting edges of the walls, and one wing of the head may rest against one or the other of the walls when the jack is extended by operating the gear lever, to retain the engaged wall while work is done thereon, or press the walls outwardly, in reshaping operations.

The extension pipes all have the same external diameter as the threaded body of the base member 74 so that any pipe may be mounted in the coupling, the collar 22 of the bracket, or in one of the anchoring heads.

The outer ends of pairs of extension pipes connected by a coupling may thus be mounted in sockets of anchors as shown in Fig. 2 to form a greatly elongated body and locate the gear bracket intermediately of the ends of the body.

Other types 96 and 98 of anchor heads are shown in Figs. 2, 3, 10 and 11, comprising curved plates, type 96 having a bearing face formed on a relatively long radius, and type 98 having a face formed on a relatively short radius.

The anchor heads are interchangeable and may be connected with either the fixed socket 72 or the sliding sleeve 25, either by threading a head on the sleeve or on an extension pipe to form a fixed connection, or by connecting the ball base member with the jack body and mounting the head on the ball member to form a universal joint connection. Any head may thus serve as a base to engage a fixed portion of the automobile, and any head may serve as a ram-like member to be projected and urged against another portion of the automobile.

A clamping device illustrated in detail in Fig. 9 is further provided, including a collar portion 100 adapted to be sleeved on and rotate on one of the extension pipes and latched thereto by a set screw 102, and having diametrically opposite clamping anchor portions engageable with differently shaped portions of an automobile as presently described.

A clamping portion 104 comprises a shank 106 and diverging arms forming an angular V-shaped seat 108 that may engage over a wheel hub or like member, as shown in Fig. 4 to anchor the base end of the jack.

A clamping portion 110 includes a body having swivel mounting on the collar 100 and spaced ears that may be mounted over the edge of a plate-like member such as the running board of the automobile as shown in Fig. 5, and be clamped to the board by a set screw 113.

A still further anchor device is associated with the gear bracket, and includes an eccentric cam clamp 114 supported by a pivot pin 116 to swing between ears 118 spaced from the adjacent end wall 120 of the gear bracket arm 28, and having a toothed face 122 for latching a plate or the like to the wall 120.

The edge of a fender may be inserted in the slot-like space between the ears 118 and wall 120, and the cam may grip the head of the fender, while the opposite end of the jack is anchored to the wheel hub or running board, and operation of the gearing may effect pushing or pulling action on the fender as the mounting of the jack may allow and require, to reshape the fender. It is apparent that the V-shaped clamp anchor 104 may be turned in either direction for pushing or pulling action as desired. The swivel mounting of the clamp 110 on the rotative collar provides for a wide range of adjustment of the direction in which the jack body and gear bracket extend with reference to the work.

Attention is particularly called to the housing-like gear bracket having the spaced collars, and the lateral bracket arm extending oppositely to the lever pivot pin 32, and provided with the slot engageable over the bead of a fender and the toothed cam to latch the fender to the gear bracket. The bracket may thus be latched to depending edges of fenders of different thickness and width while the opposite end of the jack is anchored for bending the fender in one or another direction, and holding a distorted fender in normal position while an operator reshapes the fender.

For fender reshaping, the jack may be anchored by the clamp member sleeved on the screw extension, either by the V-shaped portion engaged with a wheel hub as shown in Fig. 4, or by the swivel clamping element engaged with the running board as shown in Fig. 5. The swivel member is a particularly useful improvement, since it affords means for anchoring the jack when no wheel is available, and the adjacent wheel may therefore be removed to afford easier access to the bottom surface of the fender for reshaping operations.

The couplings 85 are hexagonal, and comprise a novel feature which, together with the socket 70 and removable ball member 74 and head members provided with both ball sockets and threads, allow great flexiblity, in the assembly of a body and fender jack. The ball and socket joint may be formed at either end of the jack, and on either the screw or a pipe. One of many advantages of this structure is that a dolly 90 may be mounted on a particularly long extension by a ball and socket joint as shown in Fig. 3, and seated on the floor at one side of the automobile body, and the gear bracket may thus be located close to the opposite dolly 98 on the sleeve. A single operator may thus set up and position the jack, and may operate the dolly 98 and the gearing. With ordinary apparatus another operator would be required to operate the gearing, since it would be located close to the base dolly 90.

What I claim and desire to secure by Letters Patent is:

An automobile fender jack including a longitudinally extensible body, means on said body engageable with the fender of an automobile, and clamping means having swivel mounting adjacent the outer end of said body for attaching said end to the running board of the automobile to anchor the jack for reshaping the fender.

EDWARD E. CLARK.